United States Patent [19]

Kojima et al.

[11] Patent Number: 5,398,172
[45] Date of Patent: Mar. 14, 1995

[54] LIGHTING DEVICE FOR VEHICLE

[75] Inventors: Shinichi Kojima, Kawasaki; Satoshi Nagasawa, Higashikurume; Takeshi Ishikawa, Tokyo, all of Japan

[73] Assignee: Stanley Electric Co., Ltd., Tokyo, Japan

[21] Appl. No.: 166,510

[22] Filed: Dec. 13, 1993

[30] Foreign Application Priority Data

Dec. 21, 1992 [JP] Japan ............... 4-092114 U

[51] Int. Cl.⁶ ............................................. B60Q 1/28
[52] U.S. Cl. ................................ 362/61; 362/80; 362/359
[58] Field of Search ............ 362/80, 61, 82, 331, 362/359; 293/127; 296/194

[56] References Cited

U.S. PATENT DOCUMENTS

| | | | |
|---|---|---|---|
| 4,656,567 | 4/1987 | Morris | 362/293 X |
| 4,893,220 | 1/1990 | Kakidaira | 362/359 X |
| 5,006,966 | 4/1991 | Mikalonis | 362/310 X |
| 5,128,839 | 7/1992 | Kato | 362/331 X |
| 5,287,101 | 2/1994 | Serizawa | 362/61 X |

*Primary Examiner*—Ira S. Lazarus
*Assistant Examiner*—Thomas M. Sember
*Attorney, Agent, or Firm*—Frishauf, Holtz, Goodman & Woodward

[57] ABSTRACT

A lighting device for a vehicle includes a housing, an inner lens molded of a transparent colored material that is fitted to an opening portion of the housing; and an outer lens molded of a transparent colorless material; and a left-hand inner wall surface of the housing is dimensioned to have a length different from that of a right-hand inner wall surface of the housing. To prevent the presence of a colorless part of the inner wall surface from appearing to have a longer length, the foregoing colorless part of the inner wall surface is covered with an extension portion of the inner lens which comes in close contact with the inner wall surface. To improve the appearance of the lighting device, all surfaces associated with the inner lens, such as a part of the inner wall surface having a greater dimension a lower inner wall surface; and an upper inner wall surface are coated with the surface material that corresponds with a material coated on the extension portion of the inner lens.

6 Claims, 2 Drawing Sheets

LIGHTING DEVICE FOR VEHICLE

BACKGROUND OF THE INVENTION

1. Field of the Invention

The present invention relates generally to a lighting device for a vehicle. More particularly, the present invention relates to an improvement of a lighting device of the foregoing type which assures that appearance properties of the lighting device are not deteriorated.

2. Background Art

To facilitate understanding of the present invention, a typical conventional lighting device for a vehicle will be described below with reference to FIG. 3.

On the assumption that the lighting device 90 is mounted on the left-hand side of the vehicle, a right-hand inner wall surface 92a of a housing 92 is integrated with a device enclosure 91 for assembling, e.g., a headlamp thereon is dimensioned to have a length longer than that of a left-hand inner wall surface 92a so as to allow the contour of the housing 92 located at a front turn portion of a vehicle body to match the contour of a corner portion of the vehicle body.

With this construction, an inner lens 93 is fitted to an opening portion of the housing 92 and is positioned to be at a substantially right angle relative to the direction of forward movement of the vehicle, mainly for the purpose of determining light distribution properties of the lighting device 90. In addition, an outer lens 94 is disposed outside of the inner lens 93 which conforms to a contour of the vehicle body. To maintain harmony in appearance, a headlamp or the like is disposed together with the lighting device 90 on the device enclosure 91. A transparent colorless material is employed for molding the outer lens 94. Thus, the color of the light beam generated by the lighting device 90 is determined by a transparent colored material employed for molding the inner lens 93. In the drawing, reference numeral 95 designates a transparent colorless cover lens mounted on the vehicle body in such a manner as to allow the whole device enclosure 91 to be covered therewith so as to improve the aesthetic appearance of the integrated structure composed of the headlamp and the lighting device 90.

With the lighting device 90 conventionally constructed in the above-described manner, since the transparent colorless material is employed for the outer lens 94, the presence of a part of the right-hand inner wall surface 92a can visually be seen through the outer lens 94 from the outside. To prevent the wall surface 92a from being visible through the cover 95, a measure is taken such that the right-hand inner wall surface 92a is lined with a film of vacuum-deposited aluminum or paint to form a reflective surface 96 thereover so as to improve the appearance properties of the lighting device 90.

In FIG. 3, when the reflective surface 96 is formed only on a small part of the right-hand inner wall surface 92a in the vicinity of the device enclosure 91 including a housing or other lighting device such as a headlamp, a fog lamp or the like, it is necessary that the remaining part of the lighting device 90 exclusive of the reflective surface 96 be masked to prevent a film of vacuum-deposited aluminum or paint to form thereon. However, the masking step requires many manhours, and moreover, each masking operation is performed in a complicated manner. In addition, since the device enclosure 91 has a large surface area, a large quantity of gas is generated during the vacuum-depositing operation. Moreover, a long time is lost until a high degree of vacuum is developed to perform each vacuum-depositing operation. Consequently, the lighting device 90 is unavoidably fabricated at a low efficiency.

SUMMARY OF THE INVENTION

The present invention has been made in consideration of the aforementioned background.

An object of the present invention is to provide a lighting device for a vehicle which assures that no malfunction occurs; that appearance properties of the lighting device are not deteriorated due to the presence of a colorless surface area that is visually recognizable from the outside.

Another object of the present invention is to provide a lighting device of the foregoing type which can be fabricated inexpensively.

The present invention provides a lighting device for a vehicle including a housing configured to be coincident with that of the corner portion of a vehicle, a left-hand inner wall surface of the housing being dimensioned to have a length different from that of a right-hand inner wall surface of the housing, an inner lens molded of a transparent colored material and fitted to an opening portion of the housing and positioned at a substantially right angle relative to the direction of forward movement of the vehicle, and an outer lens molded of a transparent colorless material and disposed to conform with the contour of a vehicle body, wherein the inner lens includes an extension portion which extends along one of the inner wall surfaces that has a longer length while coming in close contact with the same, and the foremost end of the extension portion reaches a rear surface of the outer lens.

To assure that the appearance properties of the lighting device are not deteriorated when viewed from the front side of the vehicle, it is recommended all surfaces associated with the inner lens, i.e., an inner wall surface having a longer length, a lower inner wall surface and an upper inner wall surface are lined with the same surface layer as the extension portion of the inner lens.

Other objects, features and advantages of the present invention will become apparent from a reading of the following description which has been made in conjunction with the accompanying drawings.

BRIEF DESCRIPTION OF THE DRAWINGS

The present invention is illustrated in the following drawings in which.

DETAILED DESCRIPTION OF THE PREFERRED EMBODIMENTS

The present invention will now be described in detail hereinafter with reference to the accompanying drawings which illustrate a few preferred embodiments thereof.

Figure 1:
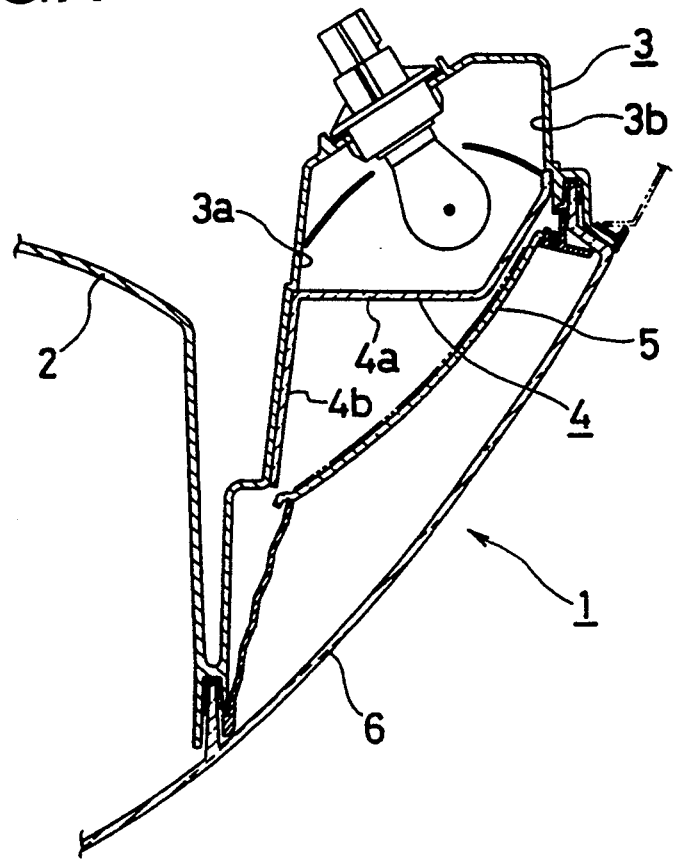
FIG. 1 is a fragmentary sectional plan view of a vehicle body, particularly showing the structure of a lighting device for a vehicle constructed according to an embodiment of the present invention.

FIG. 1 shows by way of a sectional plan view, the structure of a lighting device 1 for a vehicle constructed according to an embodiment of the present invention. In the shown case, the lighting device 1 is designed as part of a headlamp assembly and includes a housing 3 at the front turn portion of a vehicle body. The housing 3 of the lighting device 1 forms part of a device enclosure 2 integrated with a housing of another lighting device such as a headlamp, a fog lamp or the like (not shown). On the assumption that the lighting device 1 is mounted on the left-hand side of the vehicle body so as to allow the contour of the housing 3 to coincide with the contour of the corner portion of the vehicle body, a right-hand inner wall surface 3a is dimensioned to have a length longer than that of a left-hand inner wall surface 3b in the same manner as the conventional lighting device 90 described above with reference to FIG. 3. Similar to the conventional lighting device 90, a cover lens 6 is mounted on the lighting device 1 so as to allow the whole lighting device 1 to be covered therewith.

Figure 3:
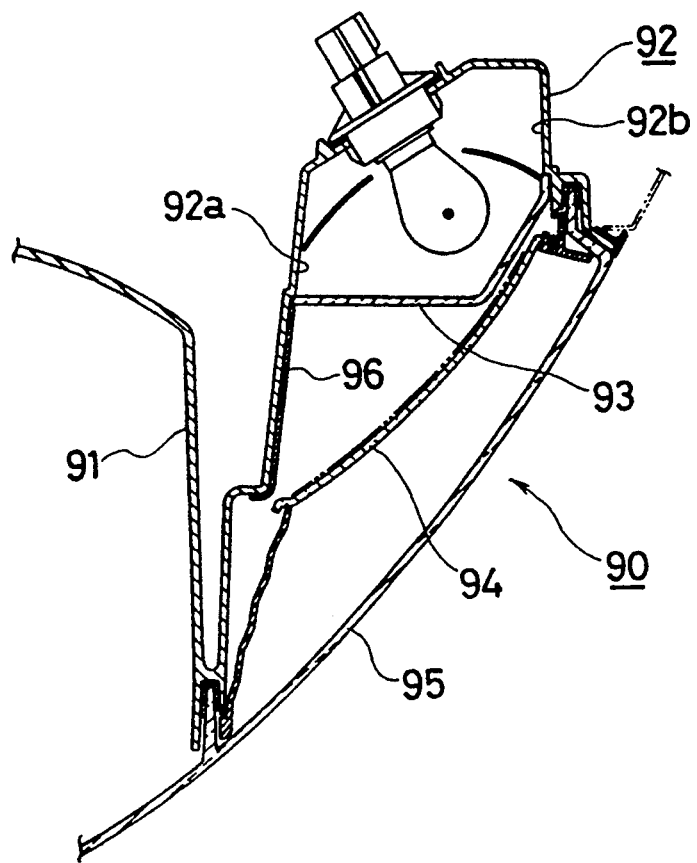
FIG. 3 is a fragmentary sectional view of a vehicle body similar to FIG. 1, particularly showing the structure of a conventional lighting device for a vehicle.

An inner lens 4 molded of a transparent colored material and an outer lens 5 molded of a transparent colorless synthetic resin are fitted to an opening portion of the housing 3, whereby the presence of a right-hand inner wall surface 3a can be seen through the outer lens 5 from the outside in the same manner as the conventional lighting device 90 of FIG. 3. In contrast with the conventional lighting device 90 of FIG. 3, according to the present invention, the inner lens 4 includes an extension portion 4b in addition to a lens portion 4a which determines light distribution properties of the lighting device 1. The arrangement of the extension portion 4b along the right-hand inner wall surface 3a makes it possible to prevent the presence of the right-hand inner wall surface 3a from being directly seen through the outer lens 5 from the outside.

The structure of the inner lens 4 will be described in more detail below.

The lens portion 4a of the inner lens 4 is fitted to the opening portion of the housing 3 to be substantially at a right angle relative to the direction of forward movement the vehicle, i.e., the direction of radiating of the light beam generated by the lighting device 1. On the other hand, the extension portion 4b of the inner lens 4 extends in a forward direction toward the front end of the vehicle while coming in close contact with the right-hand wall surface 3a so that the foremost end of the extension portion 4b reaches the rear surface of the outer lens 5.

With this construction, the whole area of the right-hand inner wall surface 3a is covered with the extension member 4b, whereby the inner wall surface 3a becomes less obvious when viewed through the transparent colorless outer lens 5. In addition, to assure that the lens portion 4a and the extension portion 4b appear to be stable within the lens 5, that a plurality of lens cuts are formed on the extension portion 4b in addition to a plurality of lens cuts that are likewise formed on the lens portion 4a.

The present invention has been described above with respect to an embodiment wherein the lighting device 1 is mounted on the left-hand side of the vehicle. Alternatively, the present invention may equally be applied to the case where it is mounted on the right-hand side of the vehicle.

Figure 2:
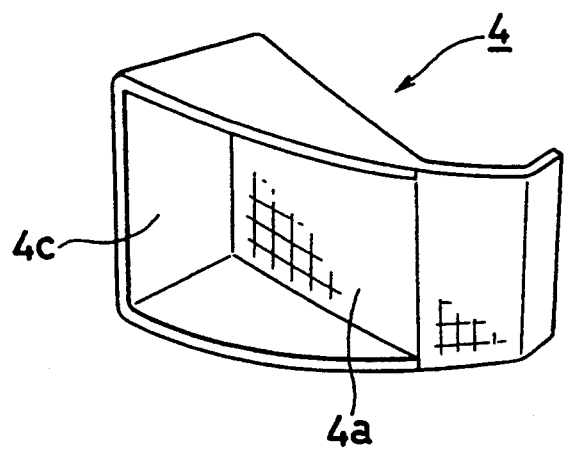
FIG. 2 is a fragmentary perspective view of a lighting device for a vehicle constructed according to another embodiment of the present invention, particularly showing an essential part constituting the lighting device.

Next, a lighting device for a vehicle constructed according to another embodiment of the present invention will be described below with reference to FIG. 2. In the preceding embodiment, the extension portion 4b is disposed only along the right-hand inner wall surface 3a of the housing 3. In contrast with the preceding embodiment, in the embodiment of FIG. 2, an extension portion 4c is disposed in such a manner that all inner wall surfaces associated with an inner lens 4, i.e., a left-hand inner wall surface 3a, a lower inner wall surface and an upper inner wall surface each visually recognizable through an outer lens 5 are coated along with the extension portion 4c. With this construction, the advantageous effects described in the preceding embodiment can be obtained with the lighting device 1.

In each of the embodiments as mentioned above, the lighting device 1 has been described with respect to the case that the housing 3 is disposed at a part of the device enclosure 2. Alternatively, the present invention may equally be applied to the case that the whole device enclosure 2 is constructed with the housing 1.

While the present invention has been described above with respect to two preferred embodiments thereof, it should of course be understood that the present invention should not be limited only to these embodiments but various changes or modifications may be made without any departure from the scope of the present invention as defined by the appended claims.

What is claimed is:

1. In an improved lighting device for a vehicle including a housing (2) configured to conform in a shape thereof with a shape of a corner portion of a vehicle body, said lighting device including: a left-hand inner wall surface of said housing that has a length different from a length of a right-hand inner wall surface of said housing, whereby one of said left-hand and right-hand inner wall surfaces of said housing has a greater length than the other one of said inner wall surfaces of said housing; an inner lens (4) molded of a transparent colored material that is fitted to an opening portion of said housing so as to be at substantially a right angle relative to a forward direction of movement of said vehicle; and an outer lens molded of a transparent colorless material, said outer lens having a shape which generally follows the shape of the corner portion of the vehicle body;

the improvement comprising:

an extension portion, formed of the transparent colored material, integrally formed on said inner lens, said extension portion extending along that inner wall surface of said left-hand and said right-hand inner wall surfaces of said housing that has the greater length; and said extension portion having a distal end portion which is extended so as to be adjacent to a rear surface of said outer lens.

2. The improved lighting device according to claim 1, wherein:

the extension portion (4b) of the inner lens is coated with a surface layer; and all surfaces of said inner lens, including:

that one of the left-hand and right-hand inner surfaces that has the greater length;

a lower inner wall surface; and an upper inner wall surface;

are coated with a surface layer that is formed of a material that forms the surface layer on the extension portion (4b) of said inner lens.

3. The improved lighting device according to claim 1, wherein a horizontal cross-sectional view of said inner lens has a generally triangular shape, said generally triangular shape comprising:

first and second arms (4b, 4a) respectively formed by said extension portion of said inner lens and by a remaining portion of said inner lens; and a curved portion of said outer lens (5) extending between said first and second arms (4a, 4b).

4. The improved lighting device according to claim 1, wherein the extension portion obscures a portion of said inner wall surface which would otherwise be visible from outside the lighting device.

5. The improved lighting device according to claim 1, wherein the extension portion extends from said inner lens substantially in a forward direction of movement of said vehicle.

6. The device according to claim 1, further comprising a lens cover (6).

* * * * *